United States Patent [19]
Craig

[11] Patent Number: 5,726,270
[45] Date of Patent: Mar. 10, 1998

[54] PROCESS FOR THE SYNTHESIS OF MONO-MODAL AQUEOUS DISPERSIONS OF POLYSILOXANES

[75] Inventor: Daniel Horace Craig, Schenectady, N.Y.

[73] Assignee: General Electric Company, Schenectady, N.Y.

[21] Appl. No.: 774,979

[22] Filed: Dec. 26, 1996

[51] Int. Cl.$^6$ .................................................. C08G 77/08
[52] U.S. Cl. ........................ 528/23; 528/12; 524/837
[58] Field of Search .................. 528/23, 12; 524/837

[56] References Cited

U.S. PATENT DOCUMENTS

| | | |
|---|---|---|
| 2,891,920 | 6/1959 | Hyde et al. . |
| 4,859,740 | 8/1989 | Damrath et al. . |
| 4,861,831 | 8/1989 | Damrath et al. . |
| 4,865,917 | 9/1989 | Lindner et al. . |
| 4,885,209 | 12/1989 | Lindner et al. . |

FOREIGN PATENT DOCUMENTS

| | | |
|---|---|---|
| 459500 | 5/1991 | European Pat. Off. . |
| 62-141029 | 6/1987 | Japan . |

OTHER PUBLICATIONS

D.R. Weyenberg et al., J. Polymer Sci., "Anionic Emulsion Polymerization of Siloxanes", Part C (27), pp. 27–34, 1969.

D. Graiver et al., Rubber Chemistry and Technology, vol. 56, "Emulsion Polymerized Polydimethylsiloxane", pp. 918–926.

J.C. Saam et al., Journal of Polymer Science: Polymer Chemistry Edition, vol. 20, "Condensation Polymerization of Oligomeric Polydimethylsiloxanols in Aqueous Emulsion", pp. 3351–3368 (1982).

T.M. Obey et al., Journal of Colloid and Interface Science, 163, "Novel Monodisperse 'Silicone Oil'/Water Emulsions", pp. 454–463 (1994).

K.R. Anderson, Langmuir 1994, 10, "Surfactant–Stabilized Silicone Oil in Water Emulsion", pp. 2493–2494 (1994).

*Primary Examiner*—Melvyn I. Marquis
*Attorney, Agent, or Firm*—Vinit G. Kathardekar; William H. Pittman

[57] ABSTRACT

A process for the synthesis of polysiloxane emulsions is discussed. The process yields mono modal polysiloxane emulsions, providing control over the particle size and dispersity.

13 Claims, No Drawings

PROCESS FOR THE SYNTHESIS OF MONO-MODAL AQUEOUS DISPERSIONS OF POLYSILOXANES

FIELD OF THE INVENTION

The instant invention relates to an improved process for the synthesis of aqueous polysiloxane dispersions. The process yields mono modal polysiloxane emulsions, providing control over the particle size and dispersity.

BACKGROUND OF THE INVENTION

The manufacture of aqueous polysiloxane emulsions is a widely practiced art typically resulting in aqueous dispersions of broad particle size distributions. These dispersions have a broad utility, including the personal care, adhesives, and coating industries.

Current manufacturing practices encompass emulsification, into water, of pre-existing polysiloxane fluids and/or gums via standard high shear homogenization techniques to directly yield the dispersions. Alternatively, it is known to batch stir siloxane precursors in water in the presence of surfactants, under low shear non-homogenizing conditions, subsequent to thermal emulsion polymerization to yield the polysiloxane dispersion. These processes yield a dispersion having a broad particle size distribution. As in many areas of technology such as coatings, adhesives, inks, personal care and the like, which utilize polymer particles, particle size control can be critical to attain optimum performance of the material in its end use application. This is also true for polysiloxane emulsions where particle size has become increasingly important, for example in designing dispersions for the personal care industry.

Examples of polysiloxane emulsion polymerization processes have been known. Base catalyzed emulsion polymerization is disclosed in U.S. Pat. No. 2,891,920, which describes the process as base catalyzed with a cationic surfactant. European patent application EP 59500 A2 911204 also discloses a base catalyzed emulsion polymerization process. A base catalyzed emulsion polymerization process is thus described to comprise a process proceeding via an ionic mechanism involving pre-emulsifying cyclosiloxanes into water in the presence of a cationic surfactant and a source of hydroxide ion. These base catalyzed emulsion polymerization processes can yield high molecular weights, however reaction times are very long.

Acid catalyzed emulsion polymerization of siloxanes is also known. *Journal of Polymer Science*, Part C (27), 27, 1969 provides a detailed report on the use of dodecylbenzene-sulfonic acid as both catalyst and surfactant for the acid-catalyzed synthesis of polydimethyl-siloxane emulsions from permethylcyclo-siloxanes.

Semi-continuous processes for polysiloxane emulsions are described in Japanese patent application JP62141029 A2 870624. This process utilizes a continuous addition of a pre-emulsion of cyclo-siloxanes precursor to a reactor containing large amounts of acid catalyst emulsifier. Particle sizes of polysiloxane emulsions thus formed are limited to sizes below 150 nm.

Given the variety of processes disclosed for the production of polysiloxane emulsions, it is surprising that emulsion processes are still being sought which will allow simultaneous control of polysiloxane molecular weight as well as the dispersion particle size within a narrow range. It is also surprising that a process for acid-catalyzed synthesis of high molecular weight pure polysiloxane emulsions having a relatively narrow particle size distribution in the range of 50 nm to a few microns is not available. Polysiloxane emulsions having such a particle size in a desired narrow range i.e., mono-modal particles, can provide improved polysiloxane deposition and film formation in skin care products, and would also allow the manufacture of very high emulsion solids, for example, up to 75% by weight of high molecular weight polysiloxanes, at workable emulsion viscosities. Strict control of particle size and distribution would allow specific tailoring of the dispersion to the application, with a resulting increase in performance efficiency.

Publications that relate to polysiloxane emulsion technology surprisingly do not provide a process to make essentially mono-modal, or mono-modal and multi-layered particles. Mono-modal multi-layered particles can provide dispersions with multiple properties. Thus for example, different properties can be imparted to each layer of the particles in a polysiloxane emulsion.

There is thus a need to provide polysiloxane emulsions with improved particle size control in the particle size range of about 50 nm to a few microns. There is also a need to provide a process to make mono-modal polysiloxane emulsions having a predetermined particle size in a narrow range within the aforementioned particle size range. There is also a need to provide polysiloxane dispersions containing particles possessing multi-layered structures, and a process for making such multi layered particles.

SUMMARY OF THE INVENTION

The instant invention is related to a process to make polysiloxane emulsions, comprising (a) preheating a aqueous reaction medium (A), optionally containing a surfactant, to a temperature of about 30° C. to about 110° C.; and (b) semi-continuously adding to the aqueous reaction medium (A), an aqueous reaction mixture (B) comprising a siloxane precursor, and an acid catalyst-surfactant to form a polysiloxane emulsion comprising essentially mono-modal particles having a pre-determined particle size ranging from about 50 nm to about 2 microns.

DETAILED DESCRIPTION OF THE INVENTION

The instant invention provides a process to make polysiloxane emulsions, comprising the steps of:

(a) preheating a aqueous reaction medium (A), optionally containing a surfactant, to a temperature of about 30° C. to about 110° C.; and (b) semi-continuously adding to the aqueous reaction medium (A), an aqueous reaction mixture (B) comprising a siloxane precursor, and an acid catalyst-surfactant to form a polysiloxane emulsion comprising essentially mono-modal particles having a pre-determined particle size ranging from about 50 nm to about 2 microns. An embodiment of the above process comprises adding reaction mixture (B), to reaction medium (A), over a period of up to 24 hours.

A preferred embodiment of the instant invention includes a process wherein the surfactant is a salt of alkyl, alkenyl, or alk-aryl sulfonic acids. Also provided by the instant invention is a preferred process wherein the siloxane precursor is a cyclosiloxane or a mixture of cyclosiloxanes.

Another preferred embodiment of the instant invention provides a process wherein the acid catalyst-surfactant is selected from alkyl, alkaryl, and aryl sulfonic acids.

In yet another preferred embodiment of the instant invention is provided a process wherein, (a) the aqueous reaction medium (A) is preheated to a temperature of about 85° C. to about 95° C.; and (b) the reaction mixture (B) comprises from about 0.25% to about 5% acid catalyst-surfactant, by weight of the siloxane precursor.

In a more preferred embodiment of the instant invention is provided a process wherein the reaction medium (A) is pre-heated to about 86° C.; the siloxane precursor is selected from octamethylcyclotetrasiloxane and a mixture of cyclosiloxanes; and the acid catalyst-surfactant is dodecylbenzenesulfonic acid.

The processes of the instant invention use the siloxane precursor and the acid catalyst-surfactant, in the reaction mixture (B), in a ratio of about 80:20 to about 99.5:0.5. The preferred ratio being about 95:5.

Another embodiment of the instant invention provides a process to make essentially mono-modal polysiloxane emulsions, comprising the steps of (a) pre-heating a aqueous reaction medium (A), optionally comprising one or more surfactants, to a temperature of up to about 110° C.; and (b) concurrently/simultaneously adding water, a polysiloxane precursor, and an acid catalyst-surfactant to the reaction medium (A) at a rate sufficeint form a polysiloxane emulsion comprising essentially mono-modal particles having a pre-determined particle size ranging from about 50 nm to about 2 microns.

The process of the second embodiment comprises a surfactant selected from a salt of alkyl, alkenyl, or alk-aryl sulfonic acids. The siloxane precursor used in the process is a cyclosiloxane. The process in this embodiment uses an acid catalyst-surfactant selected from alkyl, alkaryl, and aryl sulfonic acids.

In one aspect of the instant invention the mixture (B) is added in portions to reaction mixture (A) over a period of up to 24 hours. The reaction mixture (A) used in the instant process can be preheated to a functionally desired temperature. Typically the reaction medium (A) is preheated to a temperature of from about 30° C. to about 110° C. The preferred temperature range being from about 75° C. to about 95° C. The instant process can, however, function at temperatures below 30° C. and above 110° C.

As provided by the instant invention, various surfactants can be used in the process of the instant invention. Acid catalyst-surfactants useful in the instant invention include surface-active sulfonic acids including alkyl-, alkylaryl-, arylsulfonic acids, mixtures of surface-active sulfonic acid salts with strong mineral acids or acids derived from monoalkyl, mono(alk-aryl) and mono(alkyl)-sulfates and mixtures of the salts of monoalkyl, mono(alk-aryl) and mono(aryl) sulfates and strong mineral acids. One may also use the various sulfonic acid catalysts/surfactants described in U.S. Pat. No. 3,294,725 which are incorporated herein by reference. Preferred surfactants include salts of alkyl, alkenyl, or alk-aryl sulfonic acids. A particularly preferred catalyst/surfactant being dodecylbenzene-sulfonic acid.

The instant invention uses a pre-emulsion siloxane precursor which is capable of undergoing condensation reactions. Preferred pre-emulsion cyclosiloxane precursors are cyclosiloxanes which are described in the Encyclopedia of Polymer Science and Technology, Volume 15, 2nd Edition (1989), John Wiley and Sons. Particularly preferred are mixtures of cyclosiloxanes or octamethylcyclotetrasiloxane.

A particularly preferred process is one wherein the pre-emulsion siloxane precursor is octamethylcyclotetrasiloxane, or a mixture of cyclosiloxanes; the acid catalyst-surfactant is dodecylbenzene-sulfonic acid; and the temperature is about 86° C.

The mixture (B) used in the instant preferred process comprises the siloxane precursor and the acid catalyst-surfactant in a ratio of up to about 80:20. The preferred ratio being 95:5.

A particularly significant aspect of the instant invention is controlling the amount of acid catalyst present, while the siloxane precursor is being added to the reactor. Controlling the amount of the acid catalyst helps prevent undesirable formation of new polysiloxane emulsion particles derived solely from the addition of pre-emulsion. It is thus advantageous to add all of the acid catalyst into the pre-emulsion to ensure a fairly constant amount of this reaction component in the reaction mixture. One can, of course, maintain a constant ratio of the siloxane precursor to the acid catalyst-surfactant by various experimental techniques. Such techniques include simultaneous addition of the siloxane precursor and the acid catalyst-surfactant to the reaction mixture at an appropriate rate.

Polysiloxane compositions contemplated for synthesis into emulsion form utilizing the process of the instant invention can comprise linear, branched, cross linked and functionalized polysiloxanes derived from linear silanols, bifunctional siloxanes or cyclosiloxanes, including copolymers of linear polysiloxanes with mono-, di-, tri- or tetra-functional siloxane monomers, reactive group containing alkoxy silane monomers such as epoxy, amino, carboxy, vinyl and hydride containing reactive mono-, di- and tri-functional materials. Thus silicone fluids, gums, resins and organo and hydride functional derivatives would be included in the emulsion compositions contemplated herein.

The advantages of the instant invention include the ability to control the particle size of the polysiloxane emulsions. It is thus possible to achieve polysiloxane emulsions having a particle size in the range of about 50 nm to a few microns.

The process of the instant invention can function with or without a surfactant in the aqueous reaction medium (A). A surfactant helps stabilize the growing polysiloxane particles in the aqueous reaction medium. Typical surfactants that can be used in the instant invention include those selected from known groups of anionic, nonionic, or amphoteric surfactants. Preferred are anionic sulfates or sulfonates.

The siloxane precursors utilized in the instant process are generally cyclosiloxanes that can have different characteristics. These cyclosiloxanes form silanols, i.e., a —Si—OH group attached to a functionalized or non-functionalized polymer chain from acid-catalyzed ring opening reactions. It is believed that the final polysiloxane emulsions are formed by the condensation reaction, generally in the presence of an acid catalyst, thereby forming a [—Si—O—Si—] linkage. A typical example of the pre-emulsion siloxane precursor is octamethylcyclotetrasiloxane. A comprehensive list of the siloxane precursors can be found in "Silicones", Hardman & Torkelson, Encyclopedia of Chemical Technology, Volume 15, pp. 205–308, John Wiley & Sons, and is incorporated herein by reference.

The different aspects of the instant invention are illustrated by the following examples. These examples illustrate the applicability of the process of the instant invention in controlling the particle size of a acid-catalyzed polysiloxane emulsion, and in providing novel polysiloxane emulsions of narrow particle size distribution i.e., mono-modal or mono-dispersed, low emulsion viscosity, and layered/core-shell particle structures.

As described herein, mono-dispersed or mono-modal signifies particle size in a narrow size distribution. Thus, for example, a mono-modal emulsion would mean an emulsion comprising particles having a size distribution in a narrow range. The size distribution can vary from about 50 nm to a few microns, as discussed above.

EXAMPLE 1

Into a three-neck 1000 ml round bottom flask, equipped with a stirrer, a condenser, one feedport, a temperature probe, and a heating mantle was added 150 g water. The water was agitated continuously and heated to 85° C. at which point a pre-emulsified mixture of 110 g water, 3 g dodecyl-benzenesulfonic acid, and 300 g octamethylcyclotetrasiloxane was added to the reactor over 90 minutes. The reaction mixture was heated for an additional 2 hours beyond the completion of the addition of the pre-emulsion, then cooled to room temperature and characterized.

EXAMPLE 2

Into a three-neck 1000 ml round bottom flask, equipped with a stirrer, a condenser, one feedport, a temperature probe, and a heating mantle was added 150 g water. The water was agitated continuously and heated to 86° C. at which point a pre-emulsified mixture of 100 g water, 3.0 g dodecylbenzenesulfonic acid (DDBSA-Witco 1298), and 310 g octamethylcyclotetrasiloxane ($D_4$) was added to the reactor over 120 minutes. The reaction mixture was heated for an additional 4 hours beyond completion of the addition of the pre-emulsion, then cooled to room temperature and characterized.

EXAMPLE 3

Into a three-neck 1000 ml round bottom flask, equipped with a stirrer, a condenser, one feedport, a temperature probe, and a heating mantle was added 150 g water. The water was agitated continuously and heated to 86° C. at which point a pre-emulsified mixture of 100 g water, 3.0 g dodecylbenzenesulfonic acid (DDBSA-Witco 1298), and 311 g octamethylcyclotetrasiloxane ($D_4$) was added to the reactor over 218 minutes. The reaction mixture was heated for an additional 4 hours beyond completion of the addition of the pre-emulsion, then cooled to room temperature and characterized.

EXAMPLE 4

Into a three-neck 1000 ml round bottom flask, equipped with a stirrer, a condenser, one feedport, a temperature probe, and a heating mantle was added 150 g water. The water was agitated continuously and heated to 86° C. at which point a pre-emulsified mixture of 100 g water, 3.0 g dodecylbenzenesulfonic acid (DDBSA-Witco 1298), and 311 g octamethylcyclotetrasiloxane ($D_4$) was added to the reactor over 315 minutes. The reaction mixture was heated for an additional 3.5 hours beyond completion of the addition of the pre-emulsion, then cooled to room temperature and characterized.

EXAMPLE 5

Into a three-neck 1000 ml round bottom flask, equipped with a stirrer, a condenser, one feedport, a temperature probe, and a heating mantle was added 150 g water. The water was agitated continuously and heated to 86° C. at which point a pre-emulsified mixture of 100 g water, 3.0 g dodecylbenzenesulfonic acid (DDBSA-Witco 1298), and 312 g octamethylcyclotetrasiloxane ($D_4$) was added to the reactor over 418 minutes (approximately 7 hours). The reaction mixture was heated for an additional 5 hours beyond completion of the addition of the pre-emulsion, then cooled to room temperature and characterized.

EXAMPLE 6

Into a three-neck 1000 ml round bottom flask, equipped with a stirrer, a condenser, one feedport, a temperature probe, and a heating mantle was added 150 g water. The water was agitated continuously and heated to 86° C. at which point a pre-emulsified mixture of 100 g water, 3.0 g dodecylbenzenesulfonic acid (DDBSA-Witco 1298), and 315 g octamethylcyclotetrasiloxane ($D_4$) was added to the reactor over 1065 minutes (approximately 18 hours). The reaction mixture was heated for an additional 3 hours beyond completion of the addition of the pre-emulsion, then cooled to room temperature and characterized.

EXAMPLE 7

Into a three-neck 1000 ml round bottom flask, equipped with a stirrer, a condenser, one feedport, a temperature probe, and a heating mantle was added 150 g water and 0.07 g dodecylbenzenesulfonic acid (DDBSA-Witco 1298). The mixture was agitated continuously and heated to 86° C. at which point a pre-emulsified mixture of 100 g water, 2.9 g dodecylbenzenesulfonic acid (DDBSA-Witco 1298), and 320 g octamethylcyclotetrasiloxane ($D_4$) was added to the reactor over 429 minutes. The reaction mixture was heated for an additional 4.67 hours beyond completion of the addition of the pre-emulsion, then cooled to room temperature and characterized.

EXAMPLE 8

Into a three-neck 1000 ml round bottom flask, equipped with a stirrer, a condenser, one feedport, a temperature probe, and a heating mantle was added 150 g water and 0.15 g dodecylbenzenesulfonic acid (DDBSA-Witco 1298). The mixture was agitated continuously and heated to 86° C. at which point a pre-emulsified mixture of 100 g water, 2.9 g dodecylbenzenesulfonic acid (DDBSA-Witco 1298), and 314 g octamethylcyclotetrasiloxane ($D_4$) was added to the reactor over 427 minutes. The reaction mixture was heated for an additional 3.25 hours beyond completion of the addition of the pre-emulsion, then cooled to room temperature and characterized.

EXAMPLE 9

Into a three-neck 1000 ml round bottom flask, equipped with a stirrer, a condenser, one feedport, a temperature probe, and a heating mantle was added 150 g water and 0.3 g dodecylbenzenesulfonic acid (DDBSA-Witco 1298). The mixture was agitated continuously and heated to 86° C. at which point a pre-emulsified mixture of 100 g water, 2.8 g dodecylbenzenesulfonic acid (DDBSA-Witco 1298), and 314 g octamethylcyclotetrasiloxane ($D_4$) was added to the reactor over 411 minutes. The reaction mixture was diluted with 100 g water to reduce vwascosity and improve mixing prior to post cooking, heated for an additional 4 hours beyond completion of the addition of the pre-emulsion, then cooled to room temperature and characterized.

EXAMPLE 10

Into a three-neck 1000 ml round bottom flask, equipped with a stirrer, a condenser, one feedport, a temperature probe, and a heating mantle was added 150 g water and 0.45 g dodecylbenzenesulfonic acid (DDBSA-Witco 1298). The mixture was agitated continuously and heated to 86° C. at which point a pre-emulsified mixture of 50 g water, 1.25 g dodecylbenzenesulfonic acid (DDBSA-Witco 1298), and 159 g octamethylcyclotetrasiloxane ($D_4$) was added to the reactor over 280 minutes. The reaction mixture was heated for an additional 2.25 hours beyond completion of the addition of the pre-emulsion, then cooled to room temperature and characterized.

EXAMPLE 11

Into a three-neck 1000 ml round bottom flask, equipped with a stirrer, a condenser, one feedport, a temperature probe, and a heating mantle was added 150 g water and 1.5 g dodecylbenzenesulfonic acid (DDBSA-Witco 1298). The mixture was agitated continuously and heated to 86° C. at which point a pre-emulsified mixture of 75 g water, 1.16 g dodecylbenzenesulfonic acid (DDBSA-Witco 1298), and 232 g octamethylcyclotetrasiloxane ($D_4$) was added to the reactor over 320 minutes. The reaction mixture was diluted with 150 g water to reduce viscosity then cooled slowly to room temperature and characterized.

EXAMPLE 12

Into a three-neck 1000 ml round bottom flask, equipped with a stirrer, a condenser, one feed port, a temperature probe, and a heating mantle was added 150 g water and 5 g dodecylbenzenesulfonic acid (DDBSA). The mixture was agitated continuously and heated to 85° C. at which point a pre-emulsified mixture of 110 g water, 1 g dodecylbenzenesulfonic acid, and 300 g octamethylcyclotetrasiloxane was added to the reactor over 90 minutes. The reaction mixture was heated for an additional 2 hours beyond the completion of the addition of the pre-emulsion, then cooled to room temperature and characterized.

EXAMPLE 13

Into a three-neck 1000 ml round bottom flask, equipped with a stirrer, a condenser, one feedport, a temperature probe, and a heating mantle was added 150 g water. The water was agitated continuously and heated to 85° C. at which point a pre-emulsified mixture of 110 g water, 1 g dodecylbenzenesulfonic acid, and 300 g octamethylcyclotetrasiloxane was added to the reactor over 90 minutes. An additional 5 g dodecylbenzenesulfonic acid was added to the reactor prior to the post heat period and just after the addition of the pre-emulsion was completed. The reaction mixture was heated for an additional 2 hours beyond the completion of the addition of the pre-emulsion, then cooled to room temperature and characterized.

EXAMPLE 14

Into a three-neck 1000 ml round bottom flask, equipped with a stirrer, a condenser, one feedport, a temperature probe, and a heating mantle was added 150 g water. The water was agitated continuously and heated to 86° C. at which point a pre-emulsified mixture of 100 g water, 4.5 g dodecylbenzenesulfonic acid (DDBSA-Witco 1298), and 315 g octamethylcyclotetrasiloxane ($D_4$) was added to the reactor over 410 minutes (approximately 7 hours). The reaction mixture was heated for an additional 4 hours beyond completion of the addition of the pre-emulsion, then cooled to room temperature and characterized.

EXAMPLE 15

Into a three-neck 1000 ml round bottom flask, equipped with a stirrer, a condenser, one feedport, a temperature probe, and a heating mantle was added 150 g water. The water was agitated continuously and heated to 86C. at which point a pre-emulsified mixture of 100 g water, 6 g dodecylbenzenesulfonic acid (DDBSA-Witco 1298), and 314 g octamethylcyclotetrasiloxane ($D_4$) was added to the reactor over 414 minutes. The reaction mixture was heated for an additional hour beyond completion of the addition of the pre-emulsion (at 86C.), cooled to 50C. for 3 hours, then cooled to room temperature and characterized.

EXAMPLE 16

Into a three-neck 1000 ml round bottom flask, equipped with a stirrer, a condenser, one feedport, a temperature probe, and a heating mantle was added 150 g water. The water was agitated continuously and heated to 86° C. at which point a pre-emulsified mixture of 91 g water, 6.8 g dodecylbenzenesulfonic acid (DDBSA-Witco 1298), and 285 g octamethylcyclotetrasiloxane ($D_4$) was added to the reactor over 394 minutes. The reaction mixture was heated for an additional 3.5 hours beyond completion of the addition of the pre-emulsion, then cooled to room temperature and characterized.

EXAMPLE 17

Into a three-neck 1000 ml round bottom flask, equipped with a stirrer, a condenser, one feed port, a temperature probe, and a heating mantle was added 150 g water. The water was agitated continuously and heated to 85° C. at which point a pre-emulsified mixture of 110 g water, 6 g dodecylbenzenesulfonic acid, and 300 g octamethylcyclotetrasiloxane was added to the reactor over 90 minutes. The reaction mixture was heated for an additional 2 hours beyond the completion of the addition of the pre-emulsion, then cooled to room temperature and characterized.

EXAMPLE 18

Into a three-neck 1000 ml round bottom flask, equipped with a stirrer, a condenser, one feedport, a temperature probe, and a heating mantle was added 150 g water. The water was agitated continuously and heated to 85° C. at which point a pre-emulsified mixture of 110 g water, 7.5 g of a 40% by weight aqueous solution of sodium alpha-olefin sulfonate, 0.5 g 98% sulfuric acid, and 300 g octamethylcyclotetrasiloxane was added to the reactor over 90 minutes. The reaction mixture was heated for an additional 4 hours beyond the completion of the addition of the pre-emulsion, then cooled to room temperature and characterized.

EXAMPLE 19

Into a three-neck 1000 ml round bottom flask, equipped with a stirrer, a condenser, one feedport, a temperature probe, and a heating mantle was added 150 g water. The water was agitated continuously and heated to 86° C. at which point two separate feeds (1) a mixture of 100 g water and 3.6 g dodecylbenzenesulfonic acid (DDBSA-Witco 1298), and (2) 319 g octamethylcyclotetrasiloxane ($D_4$) are added concurrently via separate pumps to the reactor over 327 minutes. The reaction mixture was heated for an additional 3.5 hours beyond completion of the addition of the pre-emulsion, then cooled to room temperature and characterized.

Data collected for resulting dispersions is provided in Table 1:

TABLE 1

Properties of Polydimethylsiloxane emulsions

| Example | Solids (% by weight)[1] | Pre-emulsion Add time (minutes) | Emulsion Particle Size (nm) | | | Catalyst Concentration (weight %)[2] | Comments |
|---|---|---|---|---|---|---|---|
| | | | Dv | Dn | Dv/Dn | | |
| 1 | 48.2 | 90 | 185 | 150 | | 1% | 100% of catalyst fed continuously with pre-emulsion; high viscosity emulsion |
| 2 | 51.9 | 120 | 279 | 242 | 1.1 | 1% | 100% of catalyst fed continuously with pre-emulsion; high viscosity emulsion |
| 3 | 51 | 218 | 495 | 405 | 1.2 | 1% | 100% of catalyst fed continuously with pre-emulsion; moderate viscosity emulsion |
| 4 | 49.7 | 315 | 743 | 595 | 1.2 | 1% | 100% of catalyst fed continuously with pre-emulsion; low viscosity emulsion |
| 5 | 50.4 | 418 | 974 | 845 | 1.1 | 1% | 100% of catalyst fed continuously with pre-emulsion; low viscosity emulsion |
| 6 | 51.3 | 1065 | 1162 | 1131 | 1.03 | 1% | 100% of catalyst fed continuously with pre-emulsion; low viscosity emulsion |
| 7 | 51.9 | 429 | 743 | 689 | 1.1 | 1% | catalyst addition split 97.5/2.5 between pre-emulsion/pre-charge |
| 8 | 51.5 | 427 | 409 | 386 | 1.06 | 1% | catalyst addition split 95/5 between pre-emulsion/pre-charge |
| 9 | 43.7[3] | 411 | 307 | 291 | 1.05 | 1% | catalyst addition split 90/10 between pre-emulsion/pre-charge; high emulsion viscosity, required dilution |
| 10 | 38.6[3] | 280 | 226 | 214 | 1.05 | 1% | catalyst addition split 85/15 between pre-emulsion/pre-charge; unable to complete addition of pre-emulsion |
| 11 | 31.1[3] | 320[3] | 144 | 126 | 1.1 | 1% | catalyst addition split 50/50 between pre-emulsion/pre-charge; emulsion very thick; unable to complete addition of pre-emulsion |
| 12 | 47.5 | 90 | 94 | 71 | 1.3 | 2% | catalyst addition split 17/83 between pre-emulsion/pre-charge; emulsion very thick; difficult to complete addition of pre-emulsion |
| 13 | 48.4 | 90 | 72 | 28 | 2.6 | 2% | catalyst addition split 17/83 between pre-emulsion/post add; emulsion very thick; difficult to complete addition of pre-emulsion |
| 14 | 51.5 | 410 | 703 | 594 | 1.2 | 1.5% | 100% of catalyst fed continuously with pre-emulsion |
| 15 | 51.6 | 414 | 433 | 361 | 1.2 | 2% | 100% of catalyst fed continuously with pre-emulsion |
| 16 | 49.4[3] | 394 | 273 | 260 | 1.05 | 2.5% | 100% of catalyst fed |

TABLE 1-continued

Properties of Polydimethylsiloxane emulsions

| Example | Solids (% by weight)[1] | Pre-emulsion Add time (minutes) | Emulsion Particle Size (nm) | | | Catalyst Concentration (weight %)[2] | Comments |
|---|---|---|---|---|---|---|---|
| | | | Dv | Dn | Dv/Dn | | |
| | | | | | | | continuously with pre-emulsion; high emulsion viscosity |
| 17 | 46.5 | 90 | 109 | 55 | 2.0 | 2% | 100% of catalyst fed continuously with pre-emulsion; high emulsion viscosity |
| 18 | 47.3 | 90 | 126 | 94 | 1.3 | 1% | catalyst = sodium salt of alpha olefinsulfonate plus sulfuric acid; low viscosity emulsion |
| 19 | 52.3 | 327 | 581 | 468 | 1.2 | 1.1% | no pre-emulsion; 100% of catalyst dissolved in water was fed to the reactor concurrently with a separate cyclosiloxane feed; |

Dv = volume average particle diameter in nanometers
Dn = number average particle diameter in nanometers
[1] = solids may vary due to post dilution of emulsion to ease handling
[2] = weight percent based on cyclosiloxane added
[3] = incomplete addition of pre-emulsion, or extra water added, due to high reaction mixture viscosity Weight percent solids were determined utilizing a CEM Labwave 9000 gravimetric microwave drier, with 20 minute heat times and at full microwave output. Particle size distributions were obtained utilizing a Nicomp 370 Submicron Particle Sizer instrument applying a gaussian analysis protocol for monomodal distributions and a Nicomp analysis protocol for multimodal distributions.

What is claimed is:

1. A process to make polysiloxane emulsions, comprising the steps of:
   (a) preheating a aqueous reaction medium (A), optionally containing one or more surfactants, to a temperature of about 30° C. to about 110° C.; and
   (b) semi-continuously adding to the aqueous reaction medium (A), an aqueous reaction mixture (B) comprising a siloxane precursor, and an acid catalyst-surfactant to form a polysiloxane emulsion comprising essentially mono-modal particles having a particle size in the range of about 50 nm to about 2 microns.

2. A process of claim 1 wherein the mixture (B) is added over a period of up to 24 hours.

3. A process of claim 2 wherein the surfactant is a salt of alkyl, alkenyl, or alk-aryl sulfonic acids.

4. A process of claim 3 wherein the siloxane precursor is a cyclosiloxane.

5. A process of claim 4 wherein the acid catalyst-surfactant is aryl, alkyl, or aryl sulfonic acids.

6. A process of claim 5, wherein,
   (a) the aqueous reaction medium (A) is preheated to a temperature of about 85° C. to about 95° C.; and
   (b) the reaction mixture (B) comprises from about 0.25% to about 5% acid-catalyst surfactant, by weight of the siloxane precursor.

7. A process of claim 6 wherein the reaction medium (A) is pre-heated to about 86° C.; the siloxane precursor is octamethylcyclotetrasiloxane or a mixture of cyclosiloxanes; and the acid catalyst-surfactant is dodecylbenzenesulfonic acid.

8. A process of claim 7 wherein the ratio of the siloxane precursor to the acid catalyst-surfactant, in the reaction mixture (B), is from about 80:20 to about 95.5:0.5.

9. A process of claim 8 wherein the ratio of the siloxane precursor to the acid catalyst-surfactant, in the reaction mixture (B), is about 95:5.

10. A process to make essentially mono-modal polysiloxane emulsions, comprising the steps of:
    (a) pre-heating a aqueous reaction medium (A), optionally comprising one or more surfactants, to a temperature of up to about 110° C.; and
    (b) concurrently adding water, a siloxane precursor, and an acid catalyst-surfactant to the reaction medium (A) at a rate sufficient to form a polysiloxane emulsion comprising essentially mono-modal particles having a pre-determined particle size in the range of about 50 nm to about 2 microns.

11. A process of claim 10 wherein the surfactant is a salt of alkyl, alkenyl, or alk-aryl sulfonic acids.

12. A process of claim 11 wherein the siloxane precursor is a cyclosiloxane.

13. A process of claim 12 wherein the acid catalyst-surfactant is alkyl, alkaryl, or aryl sulfonic acids.

* * * * *